United States Patent [19]

Castricum

[11] Patent Number: 5,609,055
[45] Date of Patent: Mar. 11, 1997

[54] METHOD AND APPARATUS FOR CUTTING AND NOTCHING A HOLLOW PIPE

[75] Inventor: Wilhelmus P. H. Castricum, Palatine, Ill.

[73] Assignee: Spiral-Helix, Inc., Buffalo Grove, Ill.

[21] Appl. No.: 407,318

[22] Filed: Mar. 20, 1995

[51] Int. Cl.[6] .......................... B21F 11/00; B21C 37/00
[52] U.S. Cl. ...................... 72/49; 72/72; 72/71; 72/129; 72/132
[58] Field of Search .................... 72/50, 49, 72, 72/71, 70, 148, 129, 132, 135; 83/183, 184, 187, 667, 668, 72

[56] References Cited

U.S. PATENT DOCUMENTS

| | | | |
|---|---|---|---|
| 684,539 | 10/1901 | Cartwright | 83/308 |
| 694,524 | 3/1902 | Boyd | 83/58 |
| 957,966 | 5/1910 | Jenkins | 82/94 |
| 1,345,458 | 7/1920 | Pierce | 82/58 |
| 1,372,040 | 3/1921 | Rendano | 82/58 |
| 1,703,037 | 2/1929 | Heck | 228/136 |
| 1,740,430 | 12/1929 | Mudd | 82/101 X |
| 3,132,616 | 5/1964 | Hale et al. | 72/148 |
| 3,183,695 | 5/1965 | Darner | 72/49 |
| 3,420,032 | 1/1969 | Felt | 228/136 |
| 3,831,470 | 8/1974 | Maroschak . | |
| 3,913,430 | 10/1975 | Van Dijk | 82/82 |
| 3,982,414 | 9/1976 | Anderson | 72/50 |
| 4,054,069 | 10/1977 | Coop | 82/52.1 X |
| 4,244,202 | 1/1981 | Anderson et al. | 72/49 |
| 4,567,742 | 2/1986 | Castricum | 72/50 |
| 4,706,481 | 11/1987 | Castricum | 72/49 |
| 4,711,110 | 12/1987 | Castricum | 72/49 |
| 4,744,276 | 5/1988 | Duce | 83/188 X |
| 4,823,579 | 4/1989 | Castricum | 72/49 |
| 4,924,684 | 5/1990 | Castricum | 72/49 |

FOREIGN PATENT DOCUMENTS

| | | | |
|---|---|---|---|
| 0542649A1 | 10/1992 | European Pat. Off. . | |
| 2311625 | 12/1976 | France | 82/58 |
| 473572 | 9/1975 | U.S.S.R. | 82/82 |
| 531592 | 10/1976 | U.S.S.R. | 83/187 |
| 1215914 | 3/1986 | U.S.S.R. | 83/188 |
| 718424 | 11/1954 | United Kingdom | 83/53.1 |
| 749389 | 5/1956 | United Kingdom | 82/58 |
| 771699 | 4/1957 | United Kingdom | 83/178 |

OTHER PUBLICATIONS

Spiro Investment, S. A. Pre 1983 Spare Part Catalog, Spiro Tubeformer 2002.
Spiro Investment S. A. Pre 1983 Operation Instructions, Spiro Tubeformer 700.
Spiro Investment S. A. Pre 1983 Operation Instructinos, Spiro Tubeformer MR.
Product leaflet from Metu–System Meinig KG for circular duct flanges believed to have been published prior to Mar. 24, 1994.
European Search Report of EP 96 30 1678.

*Primary Examiner*—Lowell A. Larson
*Assistant Examiner*—Rodney Butler
*Attorney, Agent, or Firm*—Brinks Hofer Gilson & Lione

[57] ABSTRACT

An apparatus for simultaneously cutting and notching a pipe includes an upper knife assembly having a pipe cutting knife and notch cutting knives with cutting edges adjacent a surface of the pipe and a lower knife assembly having a pipe cutting knife and notch cutting knives with cutting edges adjacent an opposite surface of the pipe. A method for cutting and notching a pipe includes stopping the axial and rotational movement of a pipe and moving the lower knife assembly into an overlapping relation with the upper knife assembly. The notch cutting knives are also moved into a cutting position and the axial and rotational pipe movement is resumed.

23 Claims, 10 Drawing Sheets

METHOD AND APPARATUS FOR CUTTING AND NOTCHING A HOLLOW PIPE

BACKGROUND OF THE INVENTION

The present invention relates generally to a method and apparatus for cutting and notching hollow pipe and, more particularly, to a method and apparatus for simultaneously cutting and notching continuously formed spiral pipe.

Several pipe cutting machines use inner and outer cutters to sever a pipe or tube. These cutters are typically rotatable and have a convex or circular cutting edge for engaging the pipe. During the cutting operation, the pipe is rotated relative to the cutters or the cutters are revolved around the periphery of the pipe.

Some pipe cutting machines use these types of cutters to sever a continuously formed spiral pipe having a helical seam. Cutting machines of this type are disclosed in U.S. Pat. Nos. 4,706,481, 4,823,579 and 4,924,684, issued to the present inventor on Nov. 17, 1987, Apr. 25, 1989 and May 15, 1990. In these machines, an inner knife is attached to a boom, and an outer knife is moved into an overlapping relationship with the inner knife. As the pipe rotates and moves axially, the overlapping knives move axially with the pipe and cooperate to cut the pipe.

Spirally formed pipes are typically produced in sections of predetermined length and joined together in various ways. One method of connecting the pipe sections is to crimp one end of each pipe. The crimped end will have a slightly smaller diameter than the uncrimped end of another pipe section. A crimped end of one pipe section may then be inserted into the uncrimped end of another pipe section to connect the two sections together. An apparatus for producing pipe sections with crimped ends is disclosed in U.S. Pat. No. 4,711,110.

Another method of attaching pipe sections is to attach a flange or other type joint to the ends of the pipe sections. Flanges are desirable in that they may form air-tight connections, increase the strength of a connection and help maintain the shape of the pipe. A flange may be easily and inexpensively attached to the end of a pipe by a series of notches around the ends of each pipe section.

One present method of forming the necessary notches is to use a hand notching tool and manually notch the end of pipe sections. This method is labor intensive and may take a significant amount of time for large diameter pipes. Another option is to use a separate motorized device with a notching roller and a pipe support roller on which the formed and cut pipe may be notched. Such a device requires transporting the pipe section, mounting the pipe section onto the motorized notching device, and adjusting the pipe support roller for the size of pipe. The pipe section would also be turned around on the device to notch the opposite end. In addition to the added time and labor necessary with hand notching or a motorized notching device, a separate notching device is prone to inaccuracies both in terms of alignment of the notches with the edge of the pipe and the distance of the notch from the edge of the pipe.

Accordingly, there is a need for a pipe cutting apparatus that simultaneously cuts and notches a spirally formed pipe, decreases time and labor, and increases the precision of notches produced in a pipe.

SUMMARY OF THE INVENTION

In view of the above, the apparatus of the invention includes an upper knife assembly having an upper pipe cutting knife and at least one, and preferably first and second, upper notch cutting knives. The upper knife assembly is positioned inside the pipe. A lower knife assembly is also included having a lower pipe cutting knife and at least one, and preferably first and second, lower notch cutting knives. The lower knife assembly is positioned outside the pipe and opposite the upper knife assembly. A knife positioning mechanism is provided for moving the lower knife assembly from a standby position to a cutting position wherein the knives on the upper and lower knife assemblies overlap and puncture the pipe.

According to another aspect of the invention, the lower knife assembly of the cutting and notching apparatus has a notch cutting knife positioner. The notch cutting knife positioner moves the lower notch cutting knives, in cooperation with the knife positioning mechanism, into a cutting position independently of the lower pipe cutting knife. In a preferred embodiment, the notch cutting knife positioner has a pair of support roller assemblies mounted on a hydraulically driven lifting bracket.

According to a third aspect of the present invention, a method for simultaneously cutting and notching a spirally formed pipe which is moving in an axial direction and rotating is provided. First, an upper knife assembly adjacent an inner surface of the pipe and a lower knife assembly adjacent an outer surface of the pipe are provided. Each of the knife assemblies has a pipe cutting knife and at least one notch cutting knife. In the next step, the axial and rotational movement of the pipe is stopped. After stopping the pipe movement, the lower knife assembly moves from a standby position to a cutting position wherein the pipe cutting knife on each of the upper and lower knife assemblies overlap and puncture the pipe. The notch cutting knife, or knives, on the lower knife assembly is then moved from a standby position to a cutting position. Finally, the axial and rotational movement of the pipe is resumed so that the pipe is simultaneously severed and notched. Preferably, notches are simultaneously cut in the pipe on both the trailing end of the pipe section being severed and the leading end of the next pipe section being formed.

The present invention provides a method and apparatus for simultaneously notching and cutting of a pipe. The method and apparatus of the present invention reduces the time and labor necessary for cutting and notching a pipe in comparison to separate cutting and notching steps. Further, the present invention provides for improved accuracy of notch placement and alignment.

The invention itself, together with further objects and advantages, will be best understood by reference to the following detailed description taken in conjunction with the accompanying drawings.

DETAILED DESCRIPTION OF THE PRESENTLY PREFERRED EMBODIMENTS

Referring to the drawings, a preferred embodiment of the present invention is intended for use in a spiral pipe producing apparatus as disclosed in U.S. Pat. No. 4,567,742, issued Feb. 4, 1986, the contents of which are incorporated herein by reference.

Figure 1:
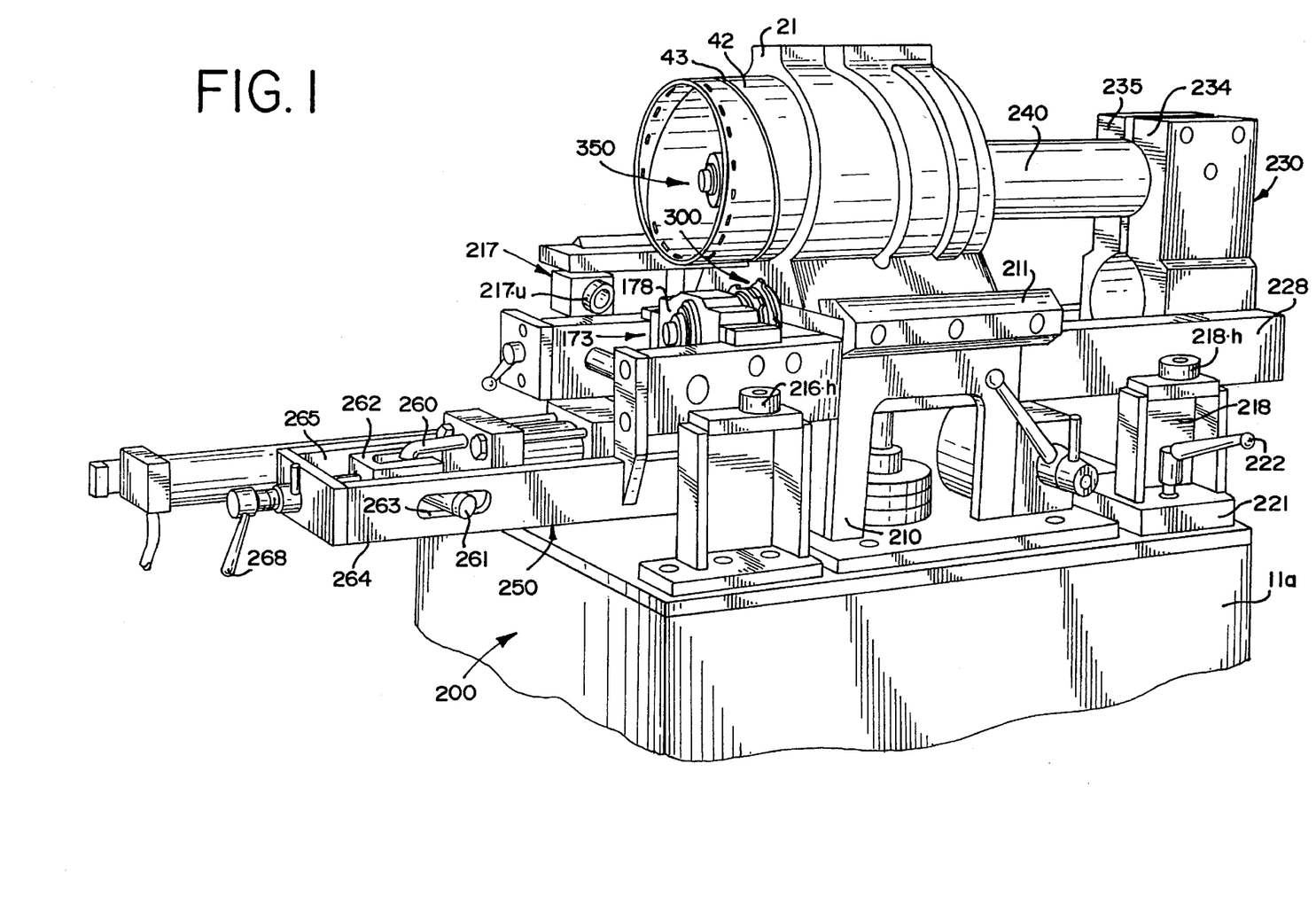
FIG. 1 is a perspective view of a cutting and notching apparatus according to one preferred embodiment of the present invention.
Figure 2:
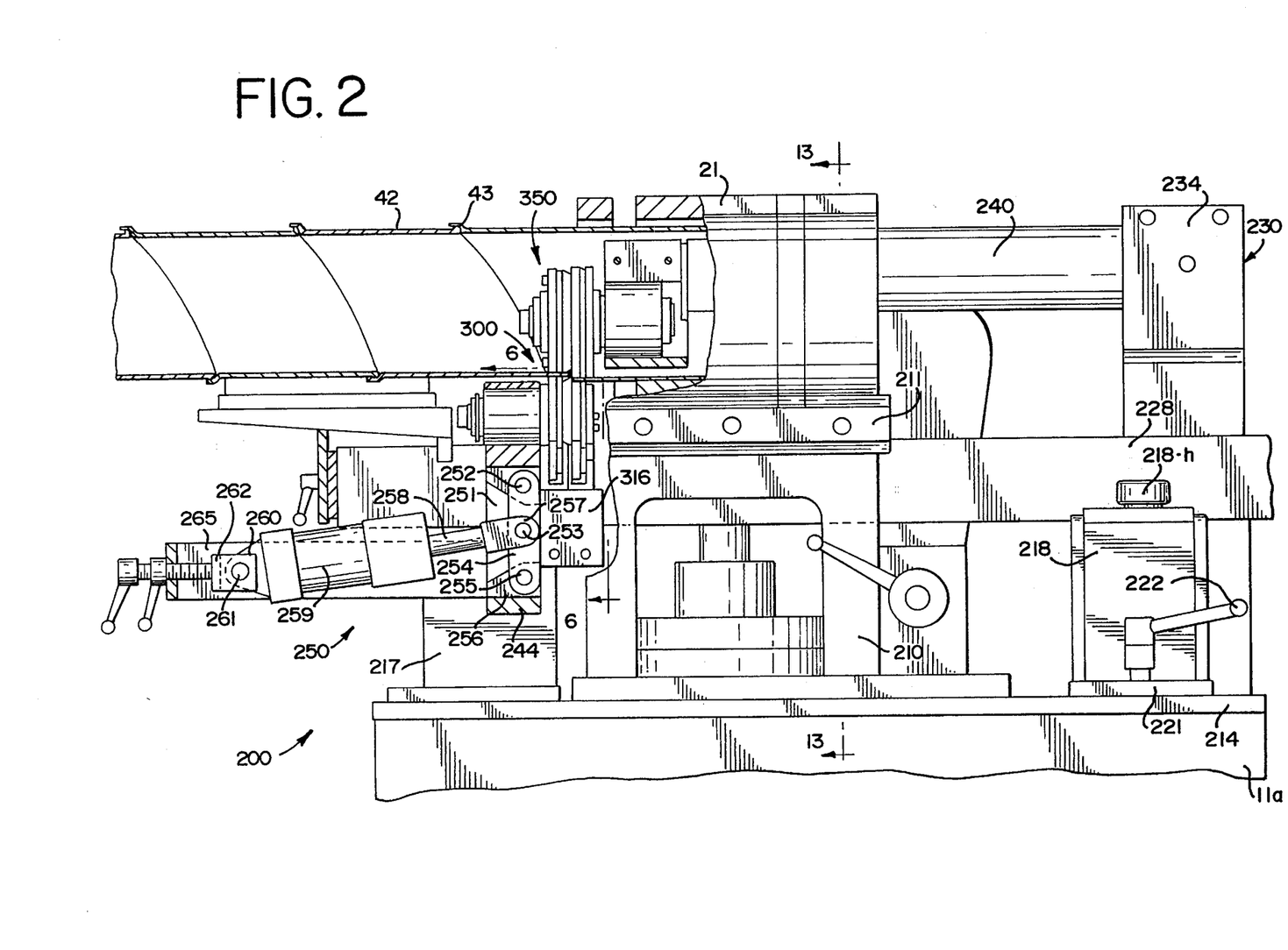
FIG. 2 is a partial cutaway side view of the device shown in FIG. 1 with the lower knife assembly in a cutting position.

For clarity, the elements of the pipe cutting and notching apparatus (or slitter assembly) 200 which are shown in FIGS. 1 and 2 use the same names and reference numbers given to them in U.S. Pat. No. 4,706,481, issued Nov. 17, 1987. All the figures and the entire disclosure of U.S. Pat. No. 4,706,481 are incorporated by reference herein and made a part hereof.

Figure 12:
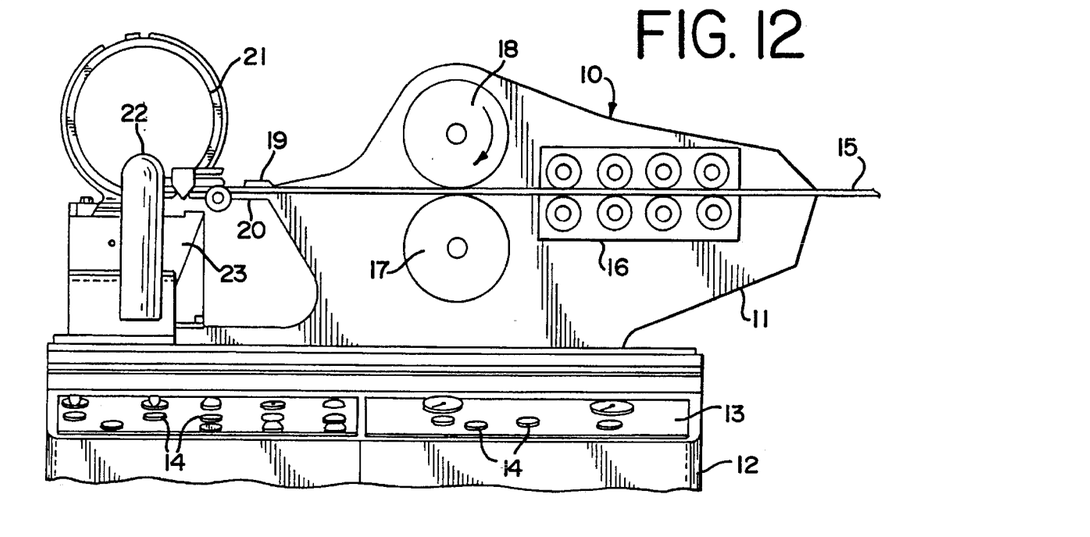
FIG. 12 is a side elevational view of a preferred spiral pipe producing machine for use with the present invention.
Figure 13:
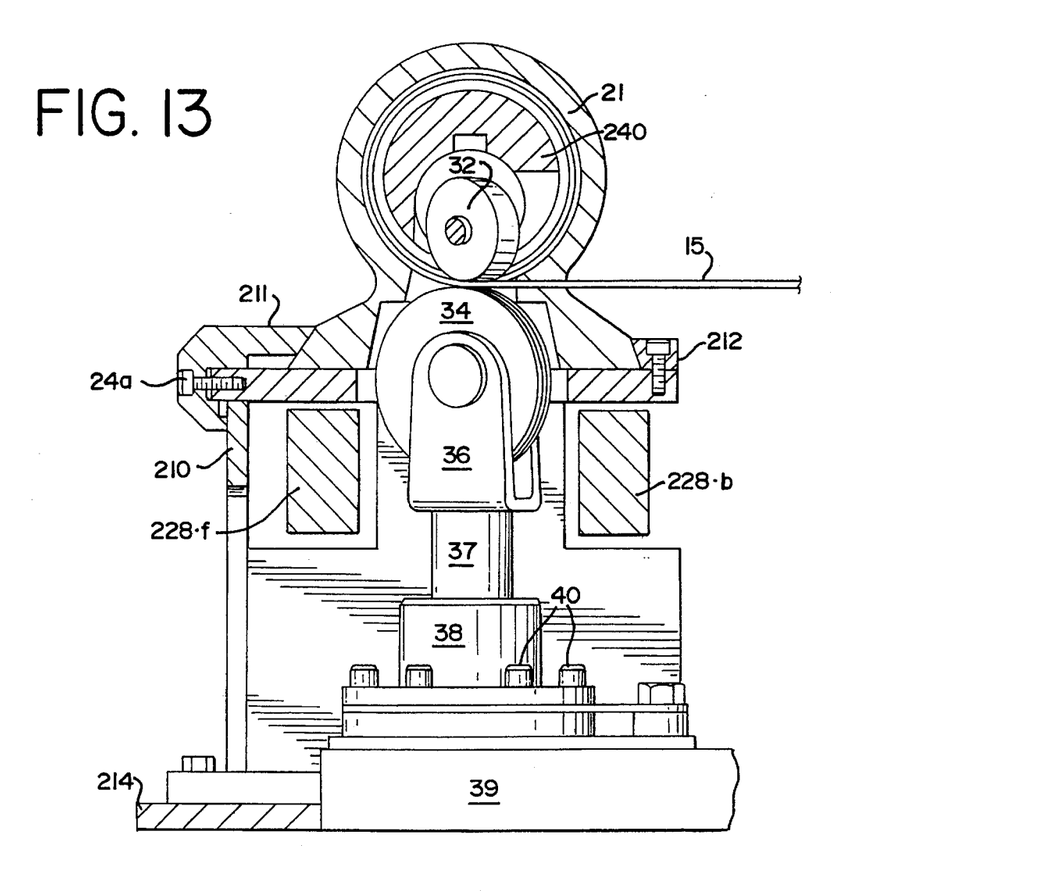
FIG. 13 is a sectional view taken along lines 13—13 of FIG. 2.

In order to provide proper background for the present invention, FIGS. 12 and 13 are referred to herein for their depiction of a preferred spiral pipe forming machine for use with the present invention. FIGS. 12 and 13 are copies of FIGS. 2 and 19 of U.S. Pat. No. 4,706,481. The spiral pipe forming machine shown in those figures will be briefly described here. The spiral pipe producing machine 10 includes a frame 11 and a control cabinet 12. A plurality of control knobs, gauges, and dials 14 are located on the control panel 13 for controlling and monitoring the operation of the machine 10 and the slitter assembly 200.

A roller housing 16 is mounted in the frame 11. The roller housing contains a plurality of rollers which bend the edges of the metal strip 15 in predetermined shapes for forming a lockseam, and which may form corrugation grooves and stiffening ribs in the metal strip. An upper drive roller 18 and a lower drive roller 17 are rotatably mounted within the frame 11 adjacent the roller housing 16. The upper drive roller 18 pulls the continuous metal strip 15 into the frame 11, through the roller housing 16, and over the lower drive roller 17. The drive rollers then cooperate to push the metal strip 15 between the upper guide plates 19 and the lower guide plates 20 into the forming head 21.

The forming head 21 curls the metal strip in a helical manner so that the outer pre-formed edges of the strip 15 are adjacent each other and mesh. The helically curled strip thus takes the shape of a spiral cylinder. The adjacent, mated edges of the strip are then compressed between a support roller 32 and a clinching roller 34 to form a lockseam 43. The metal strip 15 is continuously pushed by the drive rollers 17, 18 through the forming head 21 and between the clinching roller 34 and support roller 32, in a spiral manner, so that a spiral pipe 42 is continuously produced with a spiral lockseam 43.

The support roller 32 is mounted on the upper guide plate 19. A support arm 22 pushes down on the support roller 32 and holds it in place. The clinching roller 34 is moved into and out of its clinching position by a conventional hydraulic cylinder assembly 35, which operates in a known manner. The cylinder assembly 35 includes a yoke 36 which holds the clinching roller 34. The yoke is appended to a piston rod 37, which slides in and out of the cylinder head 38. The cylinder head 38 is attached to the cylinder barrel 39 by bolts 40. The hydraulic cylinder assembly 35 provides the pressure on the clinching roller 34 to close the lockseam 43.

The forming head 21 is secured to the forming head base 210 by the clamping bar 211 and bolts 24a. The clamping bar 211 allows the forming head 21 to be easily removed. Different size forming heads can be used with the same spiral pipe producing machine 10 to produce spiral pipe of various diameters.

As the spiral pipe is formed, it will move out of the forming head 21 in a spiral manner. That is, the pipe 42 and its leading edge will simultaneously rotate and move forward in the axial direction of the pipe. The pipe 42 will be continuously produced until it reaches its desired length. At that point the pipe cutting and notching apparatus 200 will notch and sever the pipe into a section.

Referring to FIGS. 1 and 2, a preferred embodiment of the cutting and notching apparatus 200 includes an upper and a lower knife assembly 350, 300. The upper knife assembly 350 is mounted on the end of a boom 240. The lower knife assembly is mounted on the center section 178 of the lower knife guide assembly 173. A knife positioning mechanism, preferably a pneumatic cylinder and toggle assembly 250, is used to move the center section 178 of the lower knife guide assembly, and thus the lower knife assembly 300, up and down from a standby position to a cutting position.

The cylinder and toggle assembly 250 has a single upper toggle link 251 which is pivotally connected to the center section 178 with an upper pin 252. The upper toggle link and two lower toggle links 254 are pivotally connected to a central pin 253. The lower toggle links 254 are pivotally connected at the other end to a lower pin 255. The lower pin 255 couples the lower toggle links 254 with a projection 256 integral with a strut 244. A yoke 257 couples the central pin 253 to a piston rod 258. A trunion 260 is connected to the opposite end of the cylinder barrel 259. A bar extends through the trunion 260, a second yoke 262 and the oval slots 263 in the support brackets 264, 265. The support brackets 264, 265 carry the cylinder and toggle assembly 250 and are attached to the lower knife guide assembly 173.

The cylinder and toggle assembly 250 operates under pneumatic pressure to move the center section 178, and thus the lower knife assembly 300, into a cutting position. Preferably, the toggle links are in a vertical position and the lower knife assembly is in its cutting position when the piston rod 258 is at the end of its stroke. The cylinder and toggle assembly 250 may be adjusted with a depth adjustment lever 268 to move the cylinder barrel 259 axially along the slots 263.

The lower knife guide assembly 173 is attached to a cutting guide, such as a guide roller assembly. The guide roller assembly has at least one, and preferably a pair of guide bars 228. The boom holder 230 is also attached to the end of the guide bars 228. To facilitate linear motion of the cutting and notching apparatus 200, the guide bars 228 are slidably mounted on a guide roller arrangement provided on the legs 216–219 of the apparatus. The two left base legs 216, 217 are fastened to the base plate 214 which is bolted to the spiral tube forming base 11a. The two right base legs 218, 219 are connected to a base adjustment plate 221. The threshold bolt and locking lever 222 releasably secures the legs 218, 219 and the base attachment plate 221 to the base plate 214.

The base legs 216–219 are each provided with a plurality of guide rollers. The front left leg 216 has a vertically disposed guide roller 216-l and an upper horizontally disposed guide roller 216-h. The right front leg also has vertically and horizontally disposed guide rollers 218-l, 218-h. The left back leg 217 has a lower vertically disposed guide roller 217-l, an upper vertically disposed guide roller 217-u and an upper horizontally disposed guide roller 217-h. The right back leg has upper and lower vertically disposed guide rollers 219-u, 219-l and an upper horizontally disposed guide roller 219-h. This guide roller assembly permits accurate, repeatable motion in a linear, axial direction so that the knife assemblies may move synchronously with the formed pipe 42 while at the same time cutting and notching the pipe. Such a guide rolling apparatus is described and explained in greater detail in U.S. Pat. No. 4,706,481.

Figure 3:
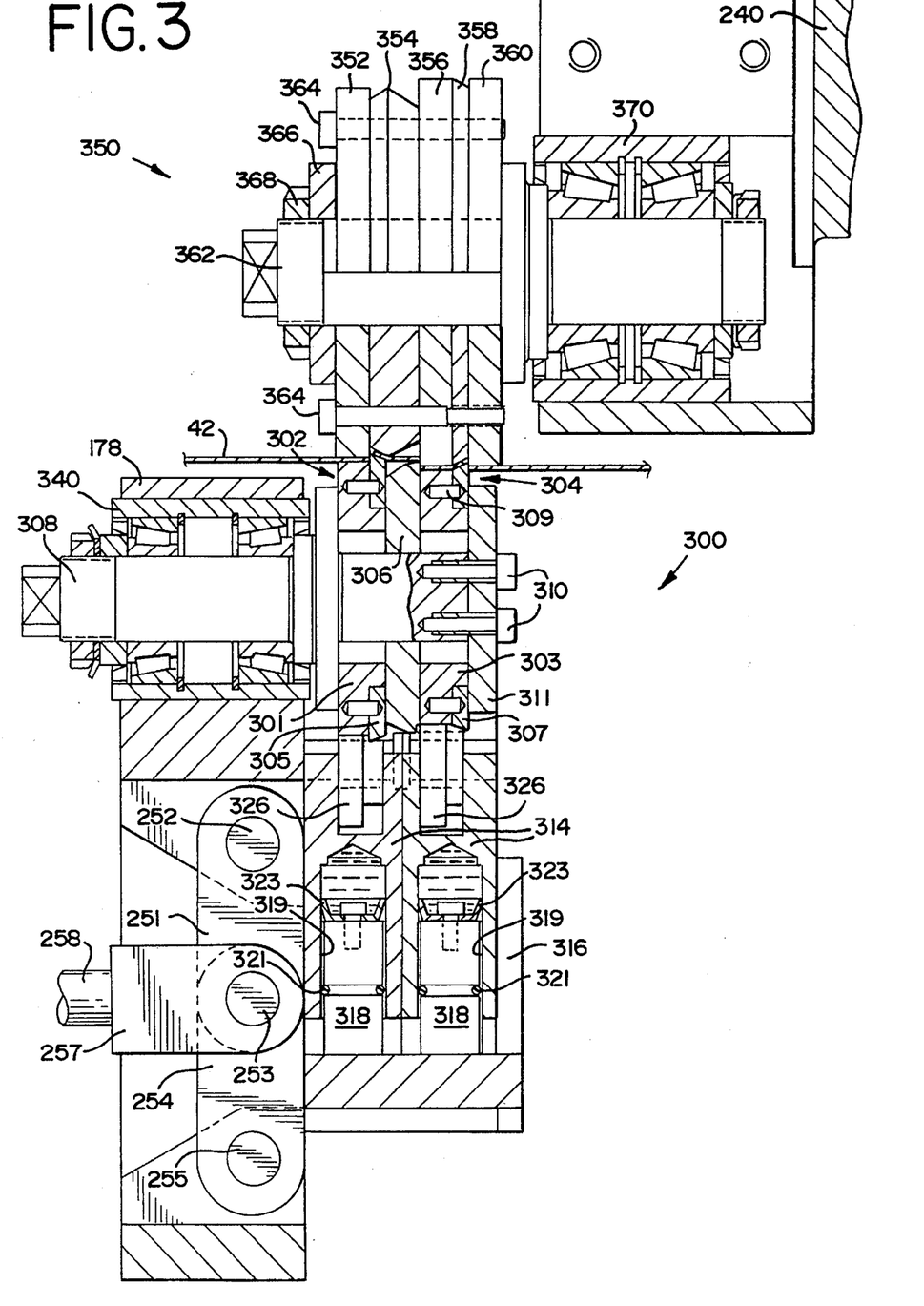
FIG. 3 is a fragmentary, cross-sectional view of the upper and lower knife assemblies showing the lower knife assembly with pipe cutting and notch cutting knives in a cutting position.
Figure 4:
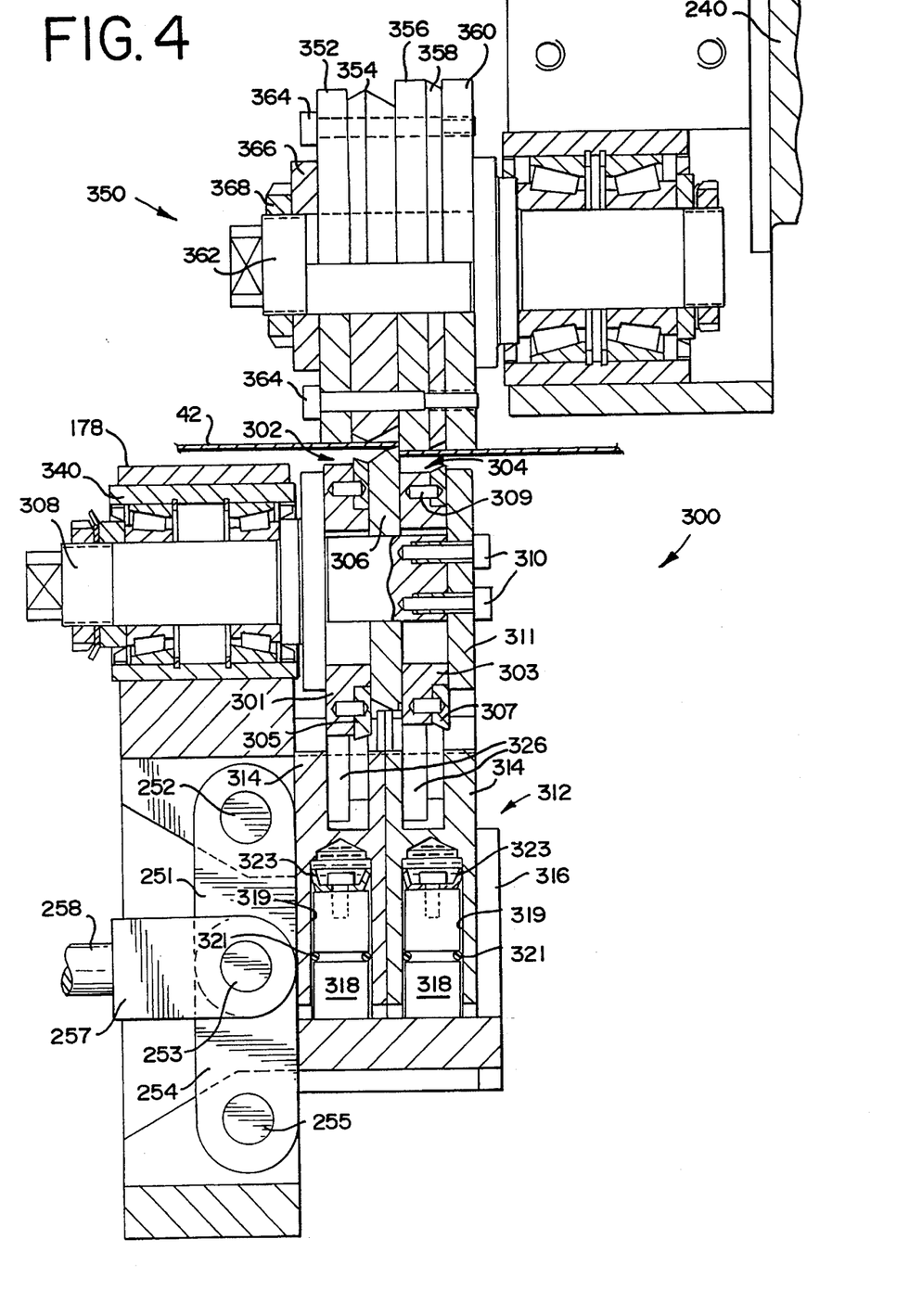
FIG. 4 is a fragmentary cross-sectional view of the upper and lower knife assemblies showing the pipe cutting knife in cutting position and the notch cutting knives in a standby position.
Figure 5:
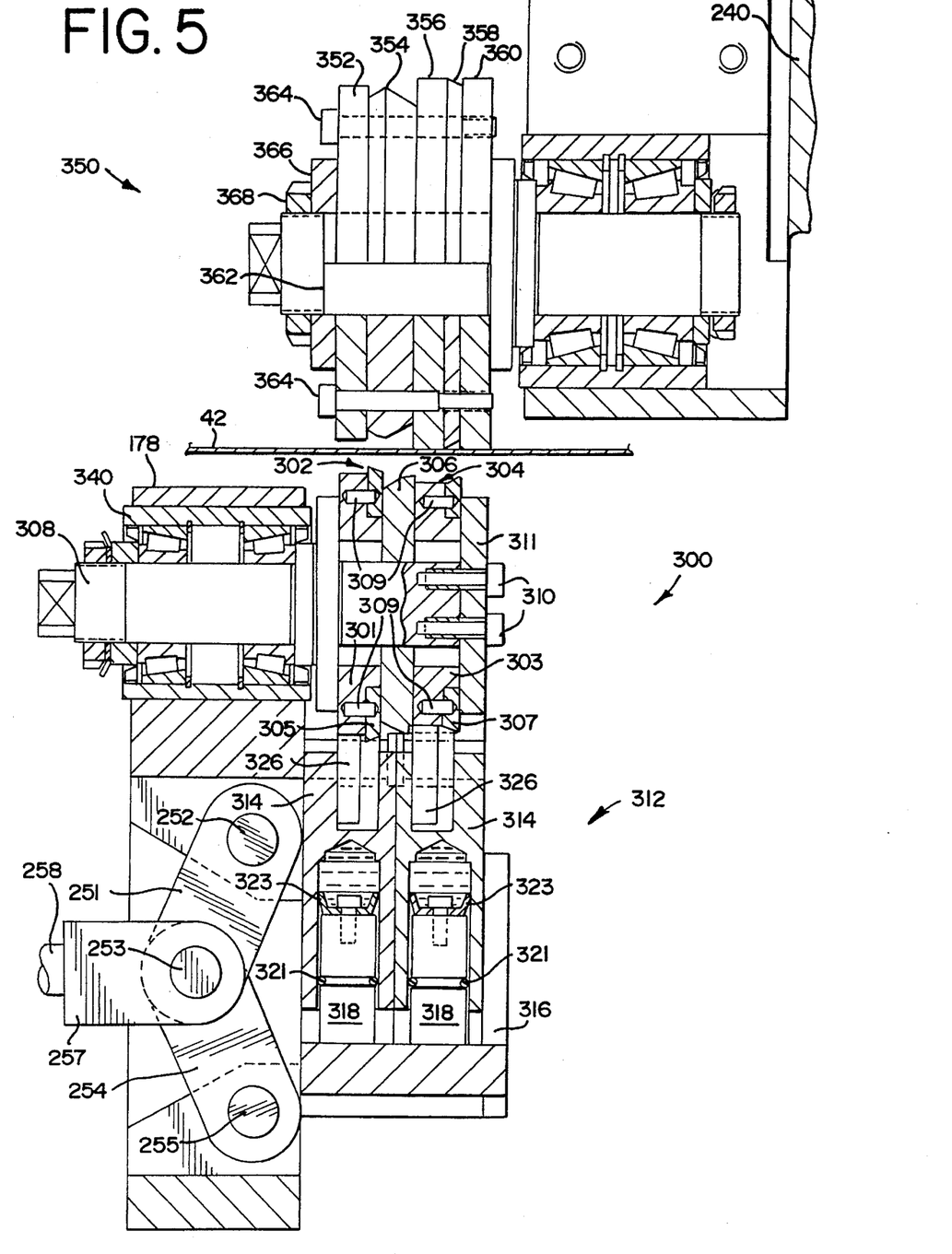
FIG. 5 is a fragmentary cross-sectional view of the upper and lower knife assemblies shown in a standby position.

As best seen in FIGS. 3–5, the upper knife assembly 350 includes a first upper notch cutting knife 352, a first notch support roll 354 an upper pipe cutting knife 356, a second notch support roll 358 and a second upper notch cutting knife 360 attached to an upper shaft 362. Each knife and Support roll is preferably separately formed from a metal material and has a bore diameter substantially equal to the shaft diameter. Tight bore diameter tolerances, preferably within +/−0.0002 inches, are necessary so that there is no free play in the radial direction when the knives and support rolls are mounted on the shaft 362. The knives and notch support rolls are attached together by bolts 364.

Preferably, the knives and notch support rolls are rotatably mounted and held in place on the shaft 362 by a retaining ring 366 and a locknut 368. The shaft 362 is rotatably mounted in an upper housing 370 that attaches to the boom 240. The boom 240 and upper knife assembly 350 are positioned inside the pipe 42. The cutting edges of the pipe cutting and notch cutting knives are positioned adjacent to the inside surface of the formed pipe with approximately a 1/16 inch clearance.

The first and second notch support rolls 354, 358 preferably have angled edges that cooperate with the notch cutting knives 302, 304 on the lower knife assembly 300. The angled edges provide an area for the first and second upper notch cutting knives 352, 360 to overlap with the first and second lower notch cutting knives 302, 304. The angled edges on the notch support rolls are at a greater angle than the angle of blades 305, 307 on the lower notch cutting knives so that there is clearance for the metal of the pipe that is punctured. The first notch support roll 354 has a second angled edge to allow for the lower pipe cutting knife 306 to overlap the upper knife cutting knife 356.

As best shown in FIGS. 3–6, the lower knife assembly 300 includes a first lower notch cutting knife 302 and a second lower notch cutting knife 304 positioned on opposite sides of the lower pipe cutting knife 306. The knives 302, 304, 306 are fastened to the lower knife shaft 308 by conventional fasteners 310 and a retaining ring 311. Preferably, the fasteners are bolts although other fasteners are contemplated. The shaft is preferably rotatably mounted in a lower housing 340, which is mounted in the center section 178. The cutting edges of the lower pipe cutting and notch cutting knives are positioned adjacent an outside area of the pipe opposite the upper knife assembly.

Although the lower notching knives 302, 304 may each be formed from a single milled piece of metal, the knives 302, 304 are preferably formed from two pieces each. According to one presently preferred embodiment of the invention, the first lower notching knife has a cutting blade adapter 301 and a notching blade 305. The second lower notching knife 304 also preferably has a cutting blade adapter 303 and a notching blade 307. The adapters 301, 303 and blades 305, 307 are held together axially on the shaft 308 by the retaining ring 311 and fasteners 310. Pins 309 are used to connect the adapters 301, 303 to their respective blades 305, 307 so that the notching blades rotate with their adapters. The two piece construction of the knives 302, 304 allows for easier, more accurate production of the notching blades 305, 307.

Additionally, the lower notch cutting knives each have a bore diameter greater than the diameter of the lower knife shaft 308 to allow for radial movement of the lower notch cutting knives 302, 304. The lower pipe cutting knife 306 preferably has a bore diameter substantially equal to the diameter of the shaft 308 so that there is no looseness or free play in the radial direction. To avoid any free play in the axial direction, the width of each of the knives is manufactured within a tolerance of +/−0.0005 inches. In a preferred embodiment, the knives and notch support rolls on the upper and lower knife assemblies are passively rotatable in response to the rotational force of the pipe when the lower knife assembly is in a cutting position. In an alternative embodiment, the knives and notch support rolls may be actively driven by a motor.

Figure 6:
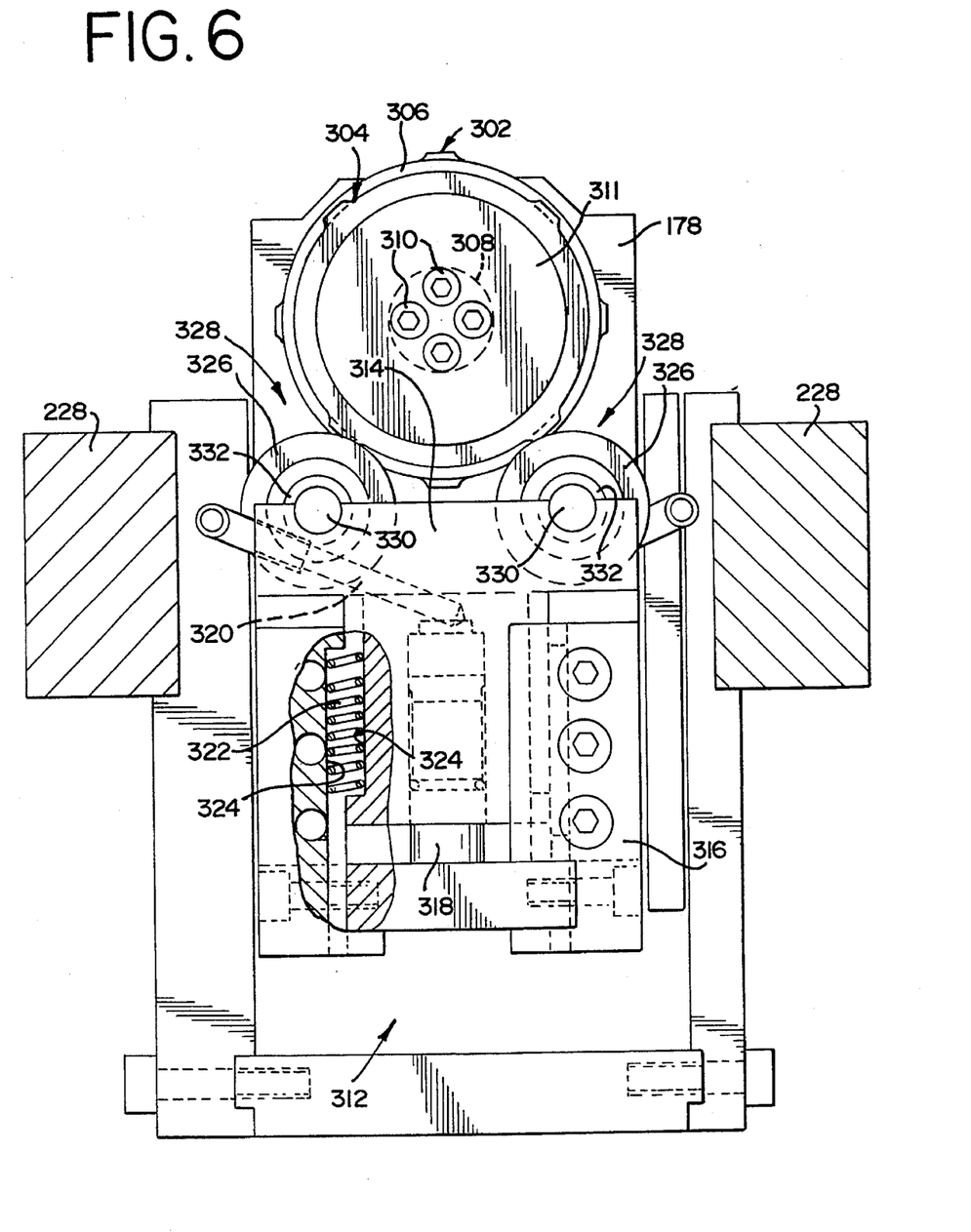
FIG. 6 is a fragmentary sectional view taken along lines 6—6 of FIG. 2.
Figure 7:
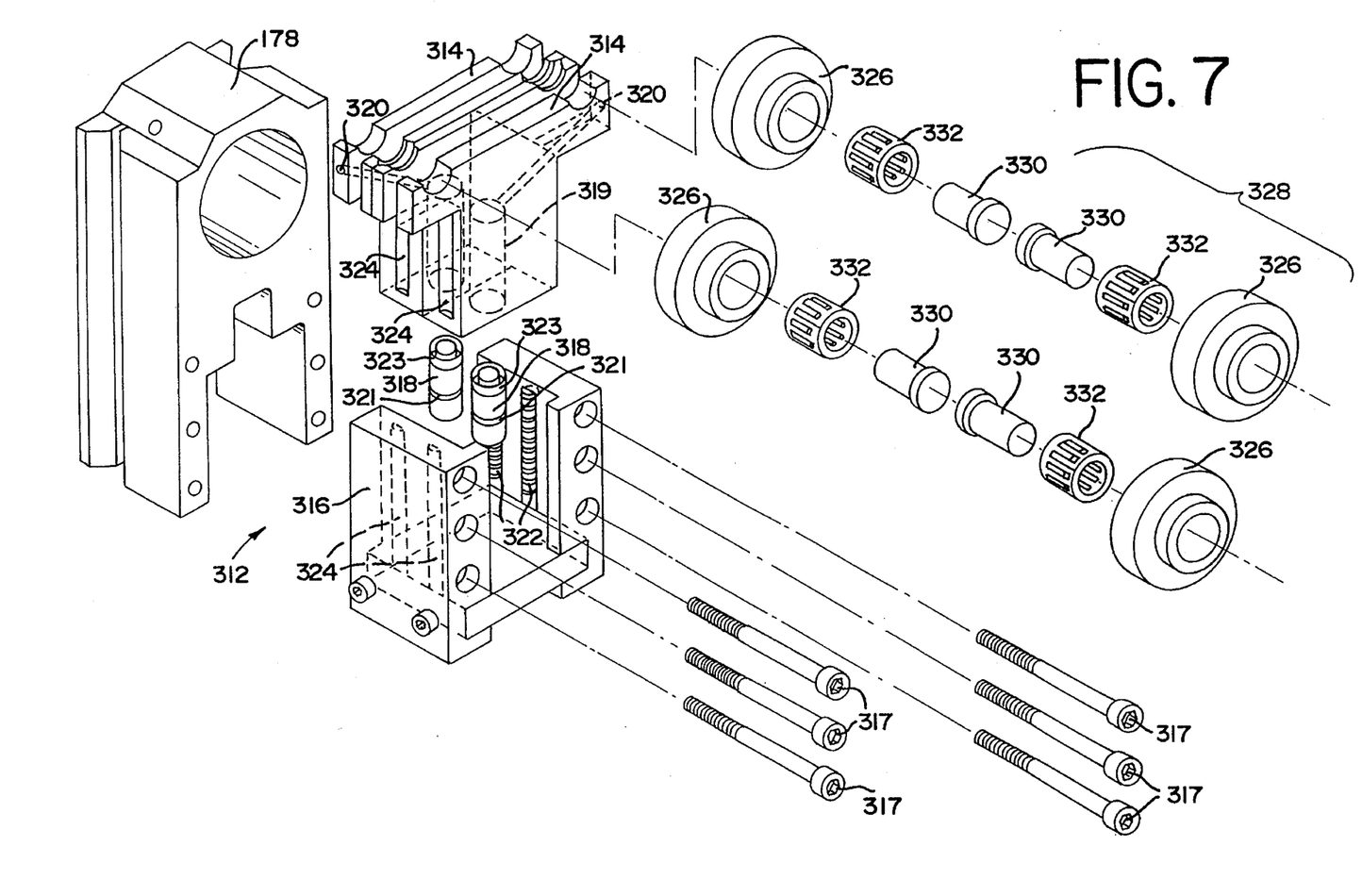
FIG. 7 is an exploded view of a notch cutting knife positioner for use in the pipe cutting and notching apparatus of FIG. 1.

The lower knife assembly 300 also includes a notch cutting knife positioner 312 for independently controlling the position of each of the lower notch cutting knives 302, 304. As shown in FIGS. 6 and 7, the positioner 312 is preferably a hydraulically driven mechanism having a pair of lifting brackets 314 slidably mounted in a housing 316. The housing 316 is attached to the center section 178 by a plurality of bolts 317. Each lifting bracket 314 has a piston 318 mounted inside a cylinder 319 formed in the lifting bracket 314.

The cylinder 319 opens out to the bottom portion of the housing 316. An O-ring 321 protects the cylinder from friction against the piston. A rubber seal 323 prevents hydraulic fluid from leaking past the piston 318. The piston 318 and cylinder 319 are provided with a hydraulic fluid, such as SHELL TELLUS 46 or MOBIL DTE 46 oils, through a hydraulic fluid channel 320 formed in the bracket 314. The piston 318 is in contact with the bottom portion of the housing 316 and is vertically oriented such than an increase in hydraulic pressure will cause the piston 318 to push down against the housing 316 and raise the bracket 314. A spring 322 opposes the force of the hydraulic pressure so that the lifting bracket 314 will return to a standby position after the hydraulic pressure is lowered. The spring 322 is mounted in an open area between the bracket 314 and housing 316 created by opposing grooves 324 on each side of the bracket 314 and housing 316.

On top of each bracket 314 are a pair of support rollers 326. The support rollers 326 are part of a support roller assembly 328 that rests on the bracket and minimizes friction between the lower notch cutting knives and the lifting bracket 314. The support roller assembly 328 is made up of a shaft 330 with a cylindrical needle bearing sleeve 332 positioned around it. The roller 326 fits over both the shaft 330 and the needle bearing sleeve 332 such that the roller may freely rotate about the shaft 330.

When notches are to be cut, the bracket 314 is lifted hydraulically by the piston and the support rollers contact the cutting blade adapters 301, 303 of the lower notch cutting knives 302, 304 and move the knives 302, 304 into cutting position. The friction of the surface of the pipe 42 against the lower notch cutting knives causes the knives to rotate which, in turn, rotates the support rollers 326. In an alternative embodiment, the support rollers may be motor driven and drive the notch cutting knives such that the rotation of the support rollers controls the rotation of the pipe when the notch cutting knives are in a cutting position.

In a preferred embodiment, the positioner 312 is capable of independently moving each notch cutting knife 302, 304. Each notch cutting knife in the lower knife assembly 300 is resting and supported on two support rollers 326 in a separate lifting bracket 314. There are at least one, and preferably two, notch cutting knives 302, 304 independently mounted on the lower shaft 308. More than two notch cutting knives may be implemented on two or more lifting brackets in another preferred embodiment. Furthermore, only one lifting bracket adapted to simultaneously position one or more notch cutting knives may be used according to another preferred embodiment.

A preferred embodiment of the upper and lower knife assemblies 350, 300 engaged in simultaneous cutting and notching of a pipe 42 is illustrated in FIG. 4. In the cutting position, the knife positioning mechanism 330 moves the lower knife assembly 300 up against the pipe 42 such that the pipe cutting knives 306, 356 overlap and puncture the pipe. The notch cutting knives, when positioned by their respective lifting brackets 314, are also overlapping such that the notch cutting blades 305, 307 overlap with the cutting edges of the upper notch cutting knives and puncture the pipe 42 at predetermined points. The notch support rolls 354, 358 are aligned with their respective notch cutting knives on the lower knife assembly.

When engaged, the notch cutting blades rotate with the pipe 42 by the force of friction created between the notch cutting knives when they are pressed together against the pipe, as seen in FIGS. 2 and 4. The cutting blade adapters 301, 303 are preferably smooth surfaced along their circumferences. In an alternative embodiment, the adapters 301, 303 may be manufactured with an abraded or knurled surface along their circumferences to increase friction against the pipe. The increased friction decreases the chance of the first and second lower notch cutting blades 305, 307 slipping against the pipe due to the heavy gauge of pipe or the smoothness of the pipe surface.

As is shown in FIGS. 3 and 4, the pipe 42 is slightly displaced by the cutting action of the upper and lower pipe cutting knives 356, 306. In order to avoid excess distortion of the pipe when notching, the notching knives are preferably of different diameters to account for the displacement. In one preferred embodiment, the first upper notch cutting knife 352 has a smaller diameter than the first lower notch cutting knife 302 and the second upper notch cutting knife 360 has a greater diameter than the second lower notch cutting knife 304. While the knives and support rolls on the upper and lower assemblies 300, 350 may be constructed from a single piece of material, the knives and support rolls are preferably individually manufactured pieces. Individually manufactured pieces permit simple adaptation of the cutting blades for different notch sizes and spacing.

Figure 8:
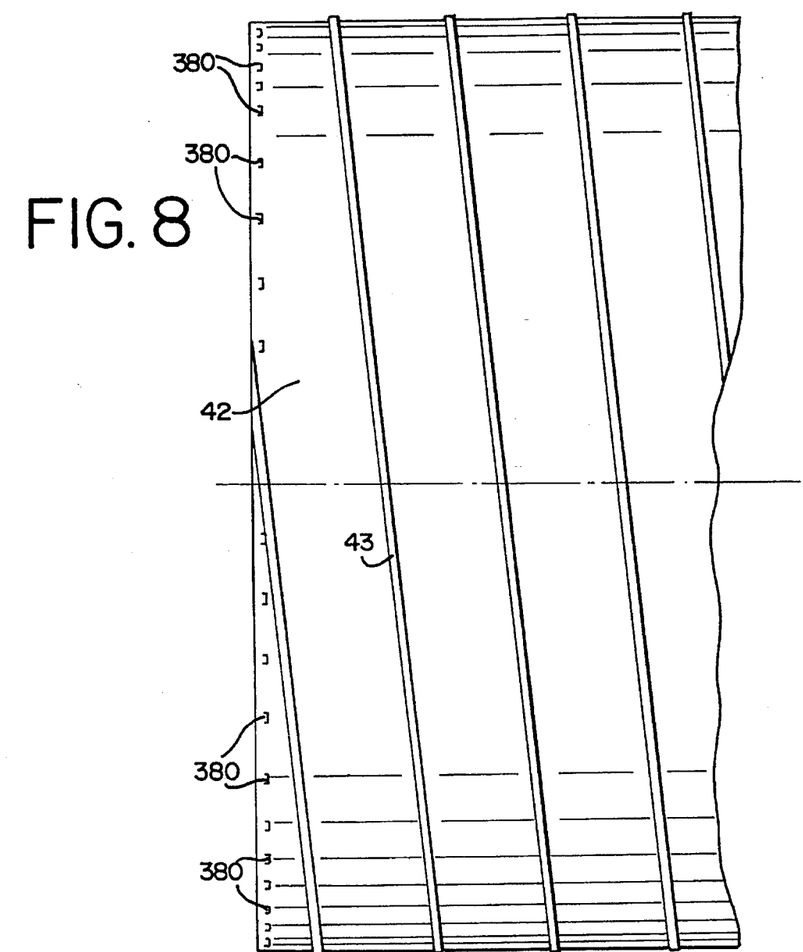
FIG. 8 is a fragmentary side view of a pipe section cut and notched with the pipe cutting and notching apparatus shown in FIG. 1.
Figure 9:
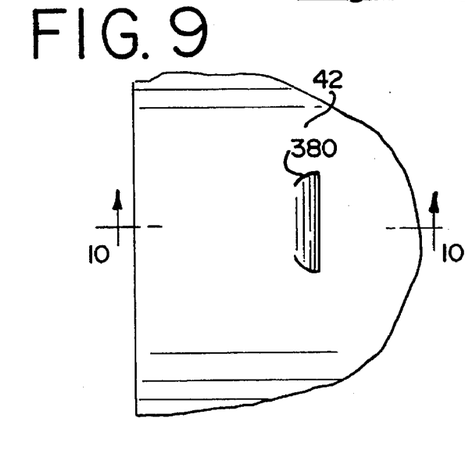
FIG. 9 is a fragmentary top view of a pipe section cut and notched with the pipe cutting and notching apparatus shown in FIG. 1.
Figure 10:
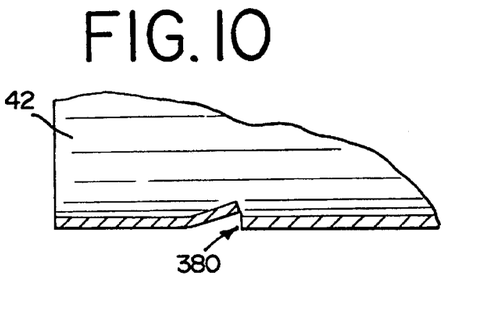
FIG. 10 is a cross-sectional view taken along line 10—10 of FIG. 9.

As best shown in FIGS. 8–10, the end result of the cutting and notching process is a pipe 42 with a plurality of notches 380 formed at a specified distance from one another and at a specified distance from the edge of the pipe 42. Notch size, spacing, angle, and distance from the end of the pipe are all preferably adjustable. Adjustments may be made by removing the notch cutting knives and support rolls on the upper and lower knife assemblies, and replacing them with knives and support rolls having the desired combination of features.

The spacing of the notches 380 from each other and from the end of the pipe may be readily adjusted by changing notch cutting knives and support rollers for the desired combination. The distance of the notches from the edge of the pipe is preferably adjustable to up to 14 millimeters in the preferred embodiment. The angle of the formed notches may be controlled by changing the lower notch cutting knives and the support rolls 354, 358. In a preferred, embodiment the notching blades 305, 307 are angled at 20°. Additionally, the notches may be made with the pipe metal bent inward or outward. An inward bent notch created from a presently preferred embodiment of the cutting and notching apparatus 200 is shown in FIGS. 9 and 10.

Also, the presently preferred individual notch cutting knives provide the advantage of dual cutting edges on the first and second upper notch cutting knives 352, 360. Because the knives 352, 360 only use one edge in the cutting process, their useful life may be doubled by disassembling the upper knife assembly and flipping the knives 352, 360 around to use the other cutting edge when the first edge has worn down.

The notch cutting knife positioner 312 preferably has the capability of adjusting for the presence of a seam. Because a seam 43 typically comprises four layers of the pipe material, it is much thicker and much more difficult to cut. Rather than attempt to notch the pipe at the seam 43, the lower notch cutting knives back off of the seam when they come in contact with one. One presently preferred embodiment of the invention utilizes a hydraulic pressure difference created when either or both of the notch cutting knives 302, 304 contact the seam and press down on the lifting brackets. The greater bore diameter of the lower notch cutting knives 302, 304 allows for individual movement and also allows for each notch cutting knife to be pushed down by the seam 43 should the cutting portion of the knives 302, 304 attempt to notch the seam.

The hydraulic pressure used to raise each lifting bracket 314 is preferably maintained at a constant level. When the notch cutting knives contact a seam, the increase in pressure causes the lifting bracket to lower until the desired constant pressure level is again reached. Hydraulic fluid that is displaced by the force of the of the notch cutting knives pressing down on the lifting brackets, which in turn compresses the piston, is bled off through the hydraulic fluid line attached to the lifting brackets 314. Once the seam has rotated past the notch cutting knife, the notch cutting knife can continue notching the pipe. Each notch cutting knife is preferably independent from the other so that if only one notch cutting knife contacts a seam, the other notch cutting knife will continue notching the pipe.

Figure 11:
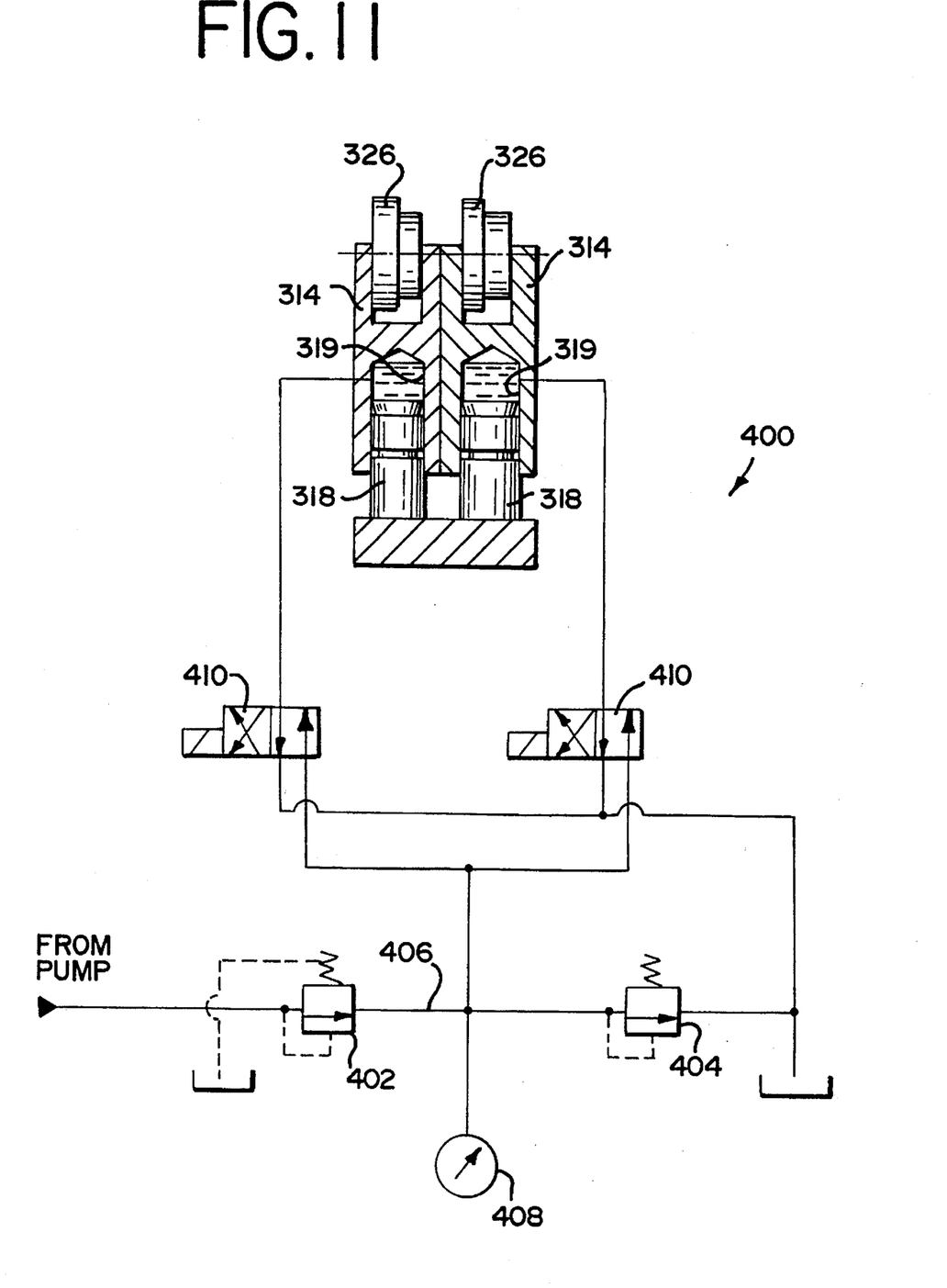
FIG. 11 is a schematic diagram of a preferred hydraulic system for use in the lower knife assembly.

FIG. 11 best shows a preferred hydraulic system 400 for use with the notch cutting knife positioner 312. Hydraulic fluid supplied from a pump (not shown) passes through a sequence valve 402 which maintains a fixed pressure on the pump-side of the valve 402 and a different, preferably lower, pressure on the output side. The hydraulic pressure for the notch cutting knife positioner is set by a relief valve 404 connected by hydraulic lines 406 to the output side of the sequence valve 402. This pressure is adjustable and is monitored by a pressure gauge 408 preferably located on the control panel 13. The piston 318 in each lifting bracket 314 is connected to a separate electrically operated directional valve 410 to provide independent notching control. The controls for each directional valve 410 are located on the control panel 13.

A preferred embodiment described above is capable of cutting and notching pipes formed from 18 gauge to 28 gauge metal. Thicker gauges may also be cut and notched with appropriate modifications to the knives and the hydraulic system. Because the gauge of the metal dictates the hydraulic pressure necessary to cut notches in the pipe, the pressure is adjusted so that the notch cutting knives will penetrate the single layer of metal in the pipe but back off from the multiple layer seam. The hydraulic pressure necessary to cause the notch cutting knives to cut through the pipe is preferably adjusted at the beginning of a production run.

Referring again to FIGS. 3–5, several positions of the lower knife assembly and the lower notching knives are shown. FIG. 3 illustrates a cutting position where both the pipe cutting and notch cutting knives are engaged in cutting and notching a pipe. When the formed pipe 42 reaches a desired length, the axial and rotational movement of the pipe is stopped and the lower knife assembly is moved into cutting position as shown in FIG. 3. If notches are desired, the notch cutting knife positioner moves the notch cutting knives on the lower knife assembly into a cutting position where the pipe is punctured by the overlapping notch cutting knives. Once the knives are in cutting position, rotational and axial movement of the pipe resumes. The pipe is preferably cut and notched in one pipe rotation after the axial and rotational movement resumes. In a preferred embodiment, the pipe is notched on both the trailing end of the pipe section being severed and the leading end of the pipe being formed. The notches are preferably formed at the same time the pipe is cut.

FIG. 4 illustrates a cutting position where the pipe 42 is only cut by the pipe cutting knives 306, 356 and the notch cutting knife positioner 312 is in a standby position. The notch cutting knife positioner 312 may also be manipulated such that one pair of notch cutting knives may be engaged to cut notches in only one end of a pipe section. FIG. 5 shows the lower knife assembly in a standby position.

From the foregoing, a cutting and notching apparatus and method has been described for cutting and notching a hollow pipe, such as spirally formed pipe. The cutting and notching apparatus includes upper and lower knife assemblies each with a pipe cutting knife and at least one notch cutting knife. The notch cutting knives on the lower knife assembly are independently movable to a cutting position by a notch cutting knife positioner that will adjust for the presence of a seam and retract the lower notch cutting knives. Additionally, the cutting and notching method and apparatus described above provides for selective and accurate cutting and notching of pipes that reduces both time and labor costs.

It is intended that the foregoing detailed description be regarded as illustrative rather than limiting, and that it be understood that the following claims, including all equivalents, are intended to define the scope of this invention.

I claim:

1. An apparatus for simultaneously cutting and notching a pipe continuously formed from a metal strip, wherein the pipe is formed with a spiral lockseam and the pipe rotates while moving axially, comprising:
    at least one upper notch cutting knife;
    an upper pipe cutting knife positioned adjacent to the at least one upper notch cutting knife;
    said upper knives each having a cutting edge adjacent an inner surface of the pipe;
    at least one lower notch cutting knife for cooperating with the at least one upper notch cutting knife to puncture an end of the pipe at a plurality of points positioned at a predetermined distance from the end of the pipe to form notches;
    a lower pipe cutting knife positioned adjacent to the at least one lower notch cutting knife for cooperating with the upper pipe cutting knife to cut the pipe; and
    said lower knives each having a cutting edge adjacent to an outer surface of the pipe whereby said apparatus operates to simultaneously cut the pipe and form notches adjacent to the cut end of the pipe.

2. The apparatus of claim 1 further comprising a knife positioning mechanism for moving the lower knives from a standby position to a cutting position.

3. The apparatus of claim 1 wherein the at least one lower notch cutting knife further comprises a plurality of cutting portions.

4. The apparatus of claim 2 further comprising a lower knife guide assembly attached to said knife positioning mechanism, and a notch cutting knife positioner attached to said lower knife guide assembly for positioning the at least one lower notch cutting knife in a cutting position independently from the lower pipe cutting knife.

5. An apparatus for simultaneously cutting and notching a pipe comprising:
    a first upper notch cutting knife having a cutting edge adjacent an inner surface of the pipe;
    an upper pipe cutting knife positioned adjacent to the first upper notch cutting knife, said upper pipe cutting knife having a cutting edge adjacent the inner surface of the pipe;
    a second upper notch cutting knife positioned adjacent to the upper pipe cutting knife wherein the upper pipe cutting knife is positioned between the first and second upper notch cutting knives, said second upper notch cutting knife having a cutting edge adjacent the inner surface of the pipe;
    a first lower notch cutting knife having a cutting edge adjacent an outer surface of the pipe for cooperating with the first upper notch cutting knife to puncture the pipe at a plurality of points a predetermined distance from an end of the pipe to form notches;
    a lower pipe cutting knife positioned adjacent to the first lower notch cutting knife, said lower pipe cutting knife having a cutting edge adjacent the outer surface of the pipe;
    a second lower notch cutting knife for cooperating with the second upper notch cutting knife to puncture the pipe at a plurality of points a predetermined distance from an end of the pipe to form notches, said second lower botch cutting knife positioned adjacent the lower pipe cutting knife and having a cutting edge adjacent the outer surface of the pipe; and
    a knife positioning mechanism for moving the lower pipe cutting knife and the first and second lower notch cutting knives from a standby position to a cutting position wherein said upper and lower pipe cutting knives will overlap and cut the pipe to form a severed pipe section and a section of pipe being formed, and wherein the notch cutting knives will simultaneously cut notches along a trailing end of the severed pipe section and a leading end of the section of pipe being formed.

6. The apparatus of claim 5 further comprising a guide roller assembly for allowing the upper and lower pipe cutting knives and the upper and lower notch cutting knives to move in an axial relation with the pipe.

7. The apparatus of claim 5 wherein the first upper notch cutting knife has a smaller diameter than the first lower notch cutting knife and the second upper notch cutting knife has a greater diameter than the second lower notch cutting knife whereby excess distortion of the pipe is avoided during notching.

8. An apparatus for simultaneously cutting and notching a pipe comprising:
   an upper knife assembly positioned inside the pipe, said upper knife assembly having an upper pipe cutting knife, a first upper notch cutting knife, and a second upper notch cutting knife;
   a lower knife assembly positioned outside the pipe and opposite the upper knife assembly, said lower knife assembly having a lower pipe cutting knife, a first lower notch cutting knife, and a second lower notch cutting knife, said lower notch cutting knives each having a plurality of cutting surfaces; and
   a knife positioning mechanism for moving the lower knife assembly from a standby position to a cutting position wherein the upper and lower pipe cutting knives cooperate to overlap and cut the pipe into a severed section and a section being formed, and wherein the first and second lower notch cutting knives cooperate with the first and second upper notch cutting knives to simultaneously cut a plurality of notches in a trailing end of the severed section and a leading end of the section being formed.

9. The apparatus of claim 8 further comprising a cutting guide for simultaneously and synchronously moving the upper and lower knife assemblies in an axial direction with the pipe.

10. The apparatus of claim 8 wherein the upper knife assembly further comprises a first notch support roll positioned between the first upper notch cutting knife and the upper pipe cutting knife, and a second notch support roll positioned between the upper pipe cutting knife and the second upper notch cutting knife.

11. The apparatus of claim 8 wherein the first and second lower notch cutting knives each comprise a cutting blade adapter, a notch cutting blade, and a plurality of pins connecting the cutting blade adapter to the notch cutting blade.

12. The apparatus of claim 1 wherein the lower knife assembly further comprises a lower shaft, the lower pipe cutting knife and the lower notch cutting knives rotatably mounted on the shaft, the lower notch cutting knives having an inner diameter greater than the diameter of the shaft such that the lower notch cutting knives are radially movable with respect to the shaft.

13. The apparatus of claim 8 wherein the lower knife assembly further comprises a notch cutting knife positioner for positioning the lower notch cutting knives in a cutting position.

14. The apparatus of claim 9 wherein the cutting guide comprises a guide roller assembly having at least one guide bar for slidably moving in the direction of the pipe, said guide bar connected to a boom attached to the upper knife assembly, said guide bar also attached to the knife positioning mechanism.

15. The apparatus of claim 10 wherein the first and second notch support rolls each comprise an angled edge for cooperating with the first and second lower notch cutting knives.

16. The apparatus of claim 13 wherein the notch cutting knife positioner comprises at least one lifting bracket for independently positioning the lower notch cutting knives.

17. The apparatus of claim 16 wherein the notch cutting knife positioner further comprises a hydraulic piston mounted in the lifting bracket for moving the lifting bracket in a radial direction, and a pair of support rollers for supporting a notch cutting knife above the lifting bracket.

18. A method for simultaneously cutting and notching a spirally formed pipe which is moving in an axial direction and is rotating comprising the steps of:
   providing an upper knife assembly adjacent an inner surface of the pipe and a lower knife assembly adjacent an outer surface of the pipe, said upper and lower knife assemblies each having a pipe cutting knife and at least one notch cutting knife;
   stopping the axial and rotational movement of the pipe;
   moving the lower knife assembly from a standby position to a cutting position wherein the pipe cutting knife on each of the upper and lower knife assemblies overlap and puncture the pipe;
   moving the at least one notch cutting knife on the lower knife assembly from a standby position to a cutting position; and
   simultaneously severing the pipe and cutting notches around a severed end of the pipe at a predetermined distance from the severed end by resuming the axial and rotational movement of the pipe wherein the pipe is severed by the pipe cutting knives and notched by the notch cutting knives.

19. The method of claim 18 wherein the at least one notch cutting knife on said upper and lower knife assemblies comprises first and second notch cutting knives located axially on opposite sites of the pipe cutting knife on the upper knife assembly and axially on opposite sides of the pipe cutting knife on the lower knife assembly, and wherein said step of moving the at least one notch cutting knife further comprises moving the first and second notch cutting knives into a cutting position such that the pipe notched on both a trailing end of a pipe section being severed and a leading end of a pipe section being formed.

20. The method of claim 18 further comprising the step of adjusting the at least one notching knife on the lower knife assembly for the presence of a seam in the pipe by backing the at least one notching knife off of the seam when the at least one notching knife contacts the seam.

21. A pipe cutting and notching apparatus for simultaneously cutting and notching a spirally formed pipe having a lockseam, said apparatus comprising:
   an upper knife assembly positioned inside the pipe, said upper knife assembly having an upper pipe cutting knife positioned between a first upper notch cutting knife and a second upper notch cutting knife;
   a lower knife assembly positioned outside the pipe and opposite the upper knife assembly, said lower knife assembly having a lower pipe cutting knife positioned between a first lower notch cutting knife and a second lower notch cutting knife, said lower pipe cutting knife and said first and second lower notch cutting knives positioned coaxially on a lower knife shaft;

said lower notch cutting knives each having a bore diameter greater than a diameter of the lower knife shaft to allow radial movement of the lower notch cutting knives, and said lower notch cutting knives each having a plurality of cutting edges;

a knife positioning mechanism for moving the lower knife assembly from a standby position to a cutting position wherein the upper and lower pipe cutting knives cooperate to overlap and cut the pipe into a severed section and a section being formed, and wherein the first and second lower notch cutting knives cooperate with the first and second upper notch cutting knives to simultaneously cut notches in a trailing end of the severed section and a leading end of the section being formed; and said knife positioning mechanism having a hydraulically driven notch cutting knife positioner for moving the lower notch cutting knives independently of each other, said notch cutting knife positioner capable of backing off a lower notch cutting knife from a lockseam independently of the lower pipe cutting knife.

22. The apparatus of claim 21 wherein the notch cutting knife positioner comprises at least one lifting bracket supporting a pair of support rollers.

23. The apparatus of claim 21 wherein the notch cutting knife positioner comprises two lifting brackets, each lifting bracket for lifting a lower notch cutting knife, each of said lifting brackets having a hydraulically operated piston mounted inside a hollow cylinder formed in the lifting bracket for lifting and lowering a lower notch cutting knife.

* * * * *

UNITED STATES PATENT AND TRADEMARK OFFICE
CERTIFICATE OF CORRECTION

PATENT NO.   : 5,609,055
DATED        : March 11, 1997
INVENTOR(S)  : Wilhelmus P. H. Castricum It is certified that error appears in the above-indentified patent and that said Letters Patent is hereby corrected as shown below:

<u>On the Title Page</u>

In column 2, line 5, under "OTHER PUBLICATIONS", replace "Instructinos" with --Instructions--.

In claim 5, line 63, replace "botch" with --notch--.

Signed and Sealed this

Twenty-fourth Day of August, 1999

Attest:

Q. TODD DICKINSON

*Attesting Officer*   *Acting Commissioner of Patents and Trademarks*